June 27, 1933. J. D. R. FREED 1,915,780
VISUAL INDICATOR FOR RADIO DIRECTION FINDERS AND MEASURING SYSTEMS
Filed April 25, 1929
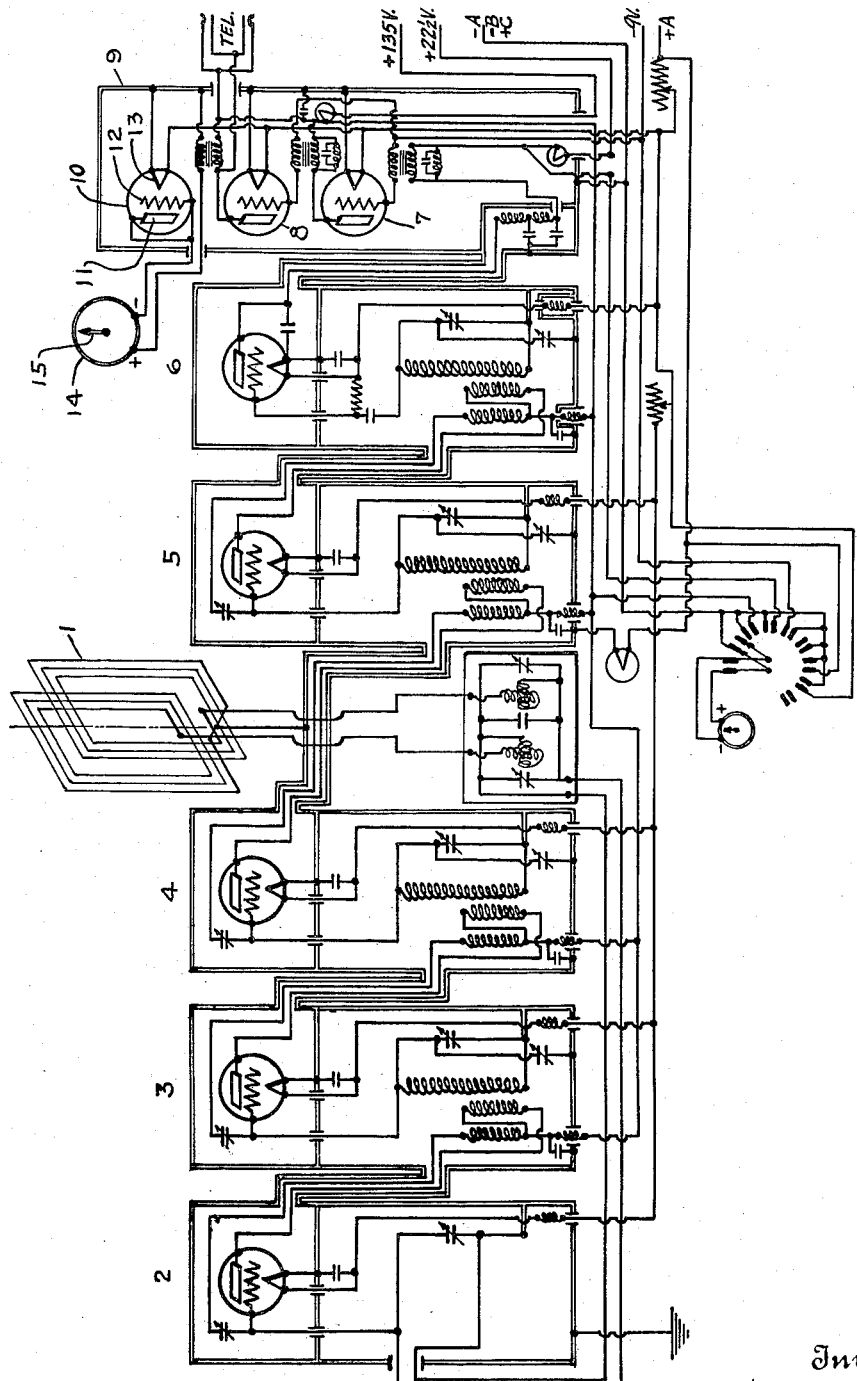
Inventors
JOSEPH D. R. FREED
By his Attorney Patented June 27, 1933

1,915,780

UNITED STATES PATENT OFFICE

JOSEPH D. R. FREED, OF NEW YORK, N. Y.

VISUAL INDICATOR FOR RADIO DIRECTION FINDERS AND MEASURING SYSTEMS

Application filed April 25, 1929. Serial No. 357,931.

My invention relates to radio direction finder and measuring systems and particularly has for its object a novel method for visually determining the direction of the received signal.

Another object of my invention is its application to the navigation of aircraft, boats, and the location of hidden mineral and oil deposits.

In the past it has been customary to employ in such systems an oral indicator or telephone receiver; some inventions have substituted a neon lamp which at best is very crude and unreliable because the accuracy attained with such devices varies with the sensitiveness of the particular operator's hearing ability and in the case of the neon lamp many errors occur into any reading because such methods are qualitative rather than quantitative indications.

I overcome the above deficiencies by the employment of an improved type of quantitative indicator whereby the pilot, navigating officer or operator can more accurately determine his direction or position by the minimum position of the loop antenna. The invention will be more clearly understood from the following description when the same is read with reference to the accompanying drawing.

The figure of the drawing illustrates diagrammatically a tuned radio frequency thermionic receiver of the "neutrodyne" type, in which 2, 3, 4 and 5 represent four stages of radio frequency amplification, each of said radio frequency stages of amplification is electromagnetically and electrostatically shielded from one another. 6 is a thermionic detector, the output circuit of which is connected with the input circuit of an audio frequency amplifier 7 and 8. 9 is another rectifier comprising a thermionic tube 10, having a plate element 11, a grid element 12 and a filament 13 with a milliammeter 14 connected in circuit so that one side is in circuit with the grid and plate of the thermionic tube 10 on the other side connected to the secondary winding of the audio frequency transformer of the last audio frequency amplifying stage 8.

Current supply and the various voltages for operation of the whole system are indicated in the drawing and therefore it is felt no detailed explanation is necessary.

Maximum signal intensity is obtained when the plane of the loop antenna 1 lies in the direction of the source of transmission, for example a radio beacon. If the source of transmission is at right angles to the plane of the rotatable loop antenna 1, then the signal intensity is zero. In all other directions the intensity of the signal varies from zero to maximum and will be so indicated quantitatively by the pointer 15 of the milliammeter 13.

It is therefore apparent that if the rotatable loop antenna is of sufficiently small dimensions to permit rotation about its vertical axis, signals transmitted from any given source will be received with raying angles of intensity until the rotatable loop antenna becomes normal or at right angles to the direction in which the transmitting source lies, at which time the signal intensity becomes zero. This position of silence or minimum reading observed on my quantitative indicator is critical, and is used to indicate with a great degree of accuracy the line of direction of the transmitting source.

Now when the pilot of an airplane, navigating officer of a ship or an operator exploring for hidden mineral or oil deposits, desires to know the direction in which his plane or ship is traveling, in other words, his exact position, he will rotate the loop antenna 1 until he picks up the desired signal and while so locating or changing the position of the said loop antenna he is careful to observe the position of the needle or pointer 15 of the milliammeter 14, thereby accurately determining the minimum position of the loop antenna, in that the loop antenna might be set at a position which gives a small but determinable value of current and then pass through the minimum position to the position where the same amount of current is again obtained. If the part covered in this operation is divided by two, it will correspond with the minimum position of the loop antenna. It is obviously impossible to do this if the observer is dependent on a lamp whose observed brilliancy can only at best be crudely determined.

When the observed minimum is broad and might cover a sector of several degrees it is necessary to obtain the correct bearing by taking bearings to either side of this position, where the signal intensity is equal and determining the mean position by dividing its angular displacement by two.

It is to be understood that applicant does not necessarily limit himself to the disclosure of the drawing in that any type of radio receiving and amplifying system may be employed in connection with his invention and that the drawing is intended to be illustrative and not limitative.

Having thus described my invention and illustrated its use, what I herein claim as new and desire to secure by Letters Patent, is the following:

1. In a radio direction finder system; a loop; means for grounding the midpoint of said loop, said loop being symmetrically wound with respect to ground potential whereby the two halves of said loop are in substantial electrostatic balance; a radio frequency receiver and amplifier connected across one of said halves of the loop; a detector connected to said amplifier; an audio frequency amplifier connected to said detector; a rectifier connected to said audio frequency amplifier for translating the output signals from said audio frequency amplifier into direct current impulses; and a milliammeter connected in said rectifier circuit and responsive to said impulse.

2. In a radio direction finder system, a loop for receiving signals; means for grounding the midpoint of said loop, said loop being symmetrically wound with respect to ground potential whereby the two halves of said loop are in substantial electrostatic balance; a radio frequency receiver and amplifier forming the sole receiver electrically associated with said loop, said receiver being connected across only one of said halves of the loop; a detector connected to said amplifier; an audio frequency amplifier connected to said detector; a rectifier connected to said audio frequency amplifier for translating the output signals in said audio frequency amplifier into direct current signals; and a milliammeter connected in said rectifier circuit and responsive to said direct current signals.

3. In a radio direction finder system, a loop for receiving signals; means for grounding the midpoint of said loop, said loop being symmetrically wound with respect to ground potential whereby the two halves of said loop are in substantial electrostatic balance; a receiver and amplifier forming the sole receiver electrically associated with said loop and having an input circuit whose grid terminal is connected to one terminal of said loop and whose cathode terminal is connected to the grounded side of said loop; an output circuit for said receiver and amplifier; and a milliammeter electrically connected in said output circuit and responsive to said signals.

Signed at New York, in the county of New York and State of New York, this 24th day of April, 1929, A. D.

JOSEPH D. R. FREED.